Aug. 10, 1948.　　　K. A. HARMON　　　2,446,761
COMBINED MAGNETO AND ALTERNATOR
Filed June 18, 1947　　　　　　　　4 Sheets-Sheet 1

INVENTOR
KENNETH A. HARMON
BY Chapin & Neal
ATTORNEYS

Aug. 10, 1948.　　　K. A. HARMON　　　2,446,761
COMBINED MAGNETO AND ALTERNATOR
Filed June 18, 1947　　　　　　　　　　4 Sheets-Sheet 3

INVENTOR
KENNETH A. HARMON
BY Chapin & Neal
ATTORNEYS

Aug. 10, 1948.  K. A. HARMON  2,446,761
COMBINED MAGNETO AND ALTERNATOR
Filed June 18, 1947  4 Sheets-Sheet 4
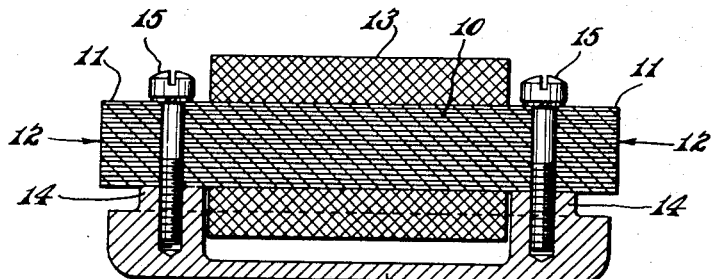
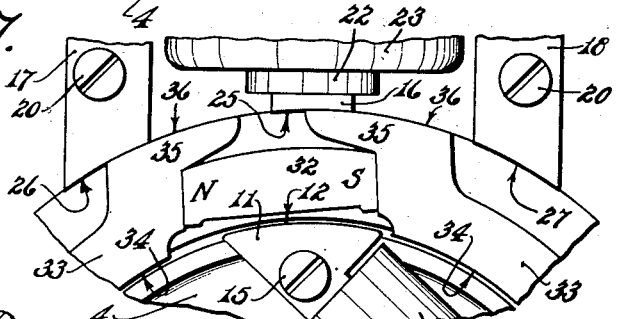
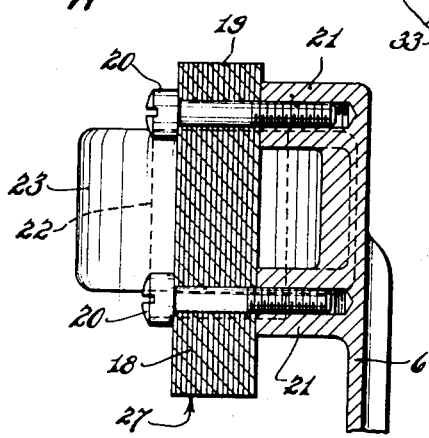
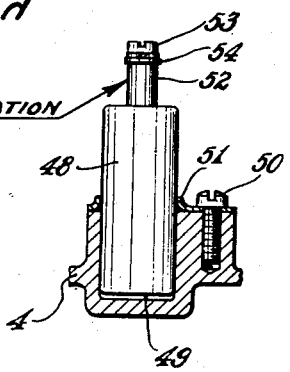
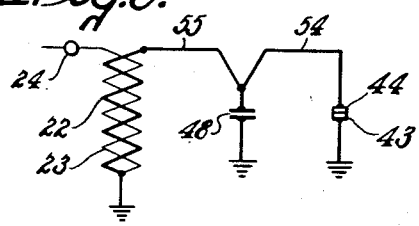
INVENTOR
KENNETH A. HARMON
BY Chapin & Neal
ATTORNEYS Patented Aug. 10, 1948

2,446,761

UNITED STATES PATENT OFFICE 2,446,761

COMBINED MAGNETO AND ALTERNATOR

Kenneth A. Harmon, Longmeadow, Mass., assignor to Wico Electric Company, West Springfield, Mass., a corporation of Massachusetts Application June 18, 1947, Serial No. 755,421

3 Claims. (Cl. 171—209)

This invention relates to a combined magneto and alternator.

The invention finds one advantageous use in connection with the engines used to drive small motorized scooters and bicycles. A magneto is needed to supply ignition for the engine and the alternator provides a supply for electric lighting. Both magneto and alternator may conveniently be driven from the engine flywheel.

The invention has for an object to provide a magneto for ignition purposes and an alternator for generating alternating current which are so combined as to derive their magnetic field from the same source—namely, an annular, permanently-magnetic rotor, which is adapted to be driven by the engine flywheel and has one set of pole shoes to periodically connect with the magnetic stator of the alternator and another set of pole shoes to periodically connect with the magnetic stator of the magneto at intervals, when the inner pole shoes are disconnected from the magnetic stator of the alternator.

The invention will be disclosed with reference to the accompanying drawings, in which.

Figure 1:
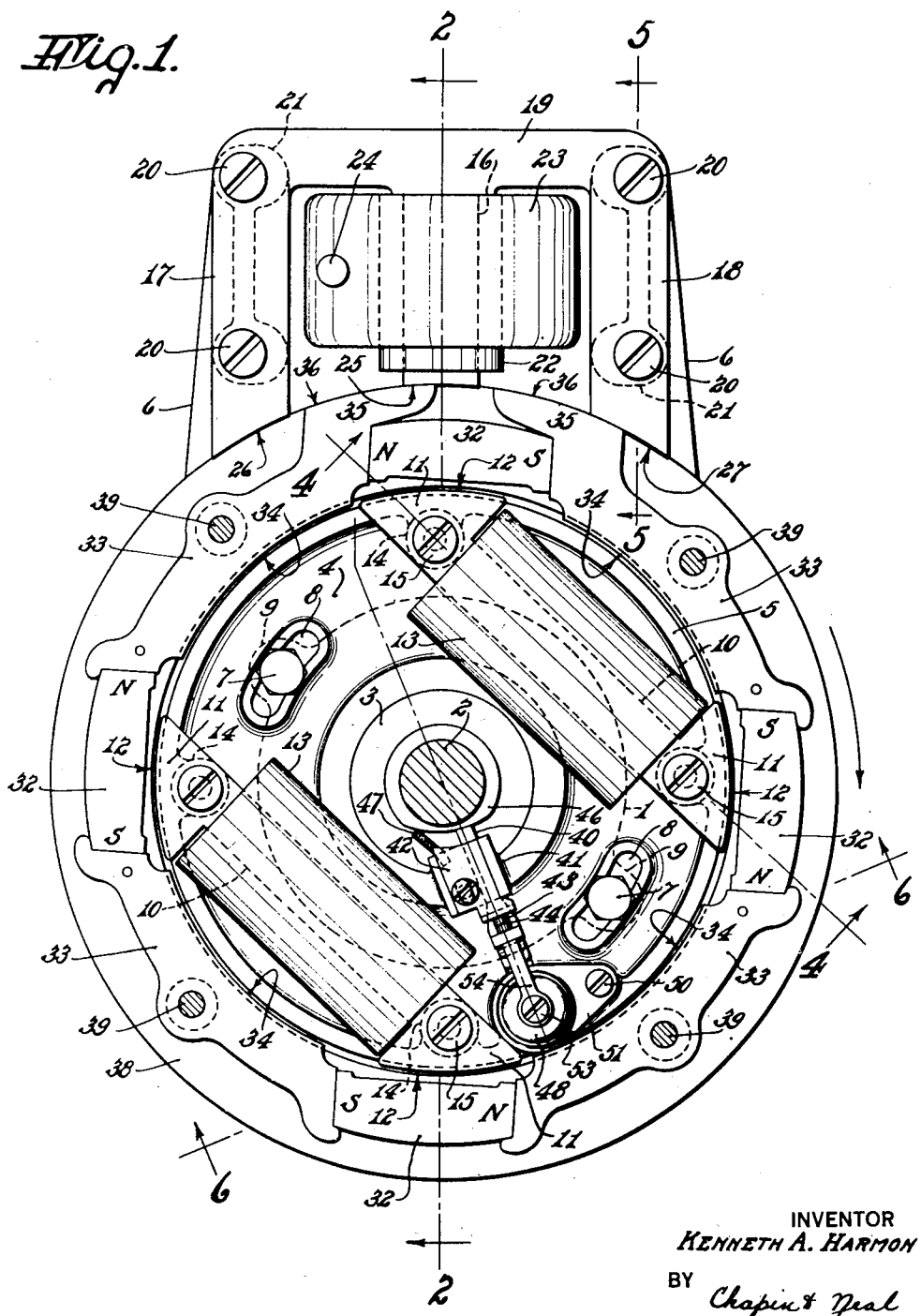
Fig. 1 is a cross-sectional view of a combined magneto and alternator, embodying the invention, such view being taken on the line 1—1 of Fig. 2.

Figs. 4, 5 and 6 are fragmentary sectional views taken on the lines 4—4, 5—5 and 6—6, respectively, of Fig. 1;

Fig. 7 is a fragmentary sectional view taken similarly to Fig. 1 but showing the rotor in a different position; and Fig. 8 is a wiring diagram showing the electrical connections of the magneto.

Figure 2:
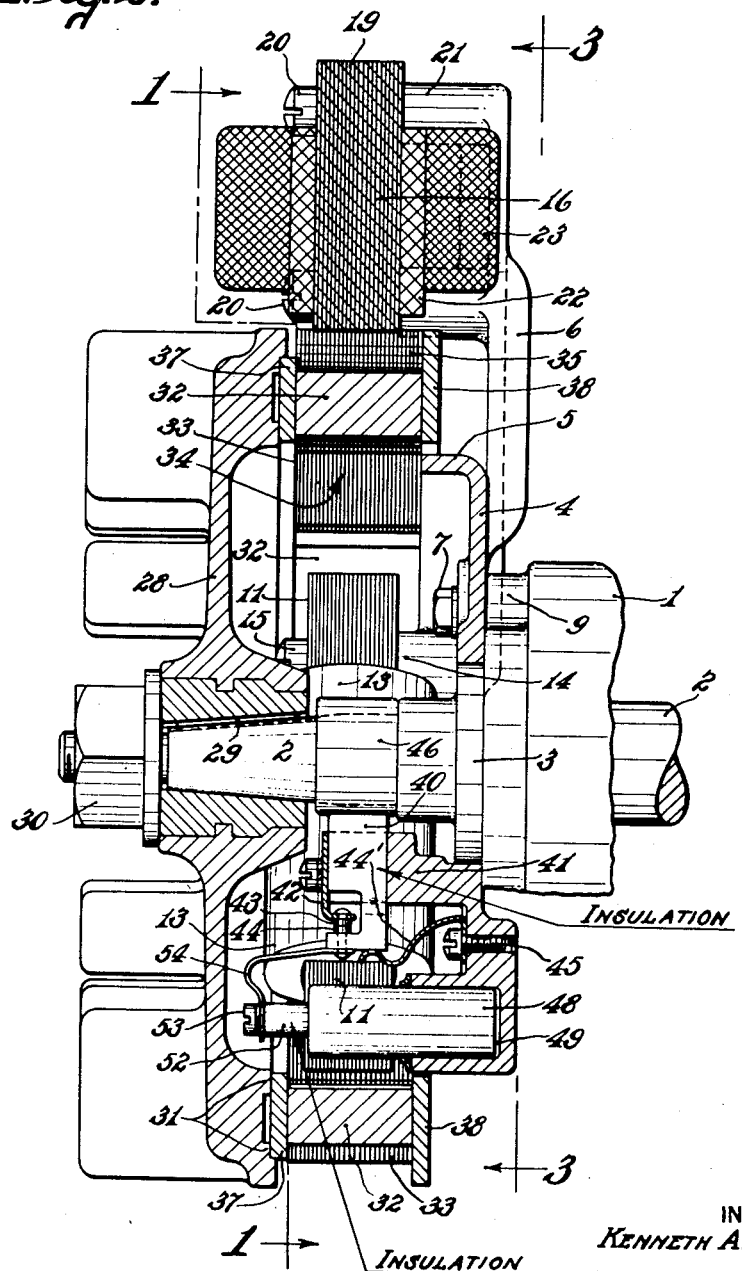
Fig. 2 is a sectional view thereof taken on the line 2—2 of Fig. 1.
Figure 3:
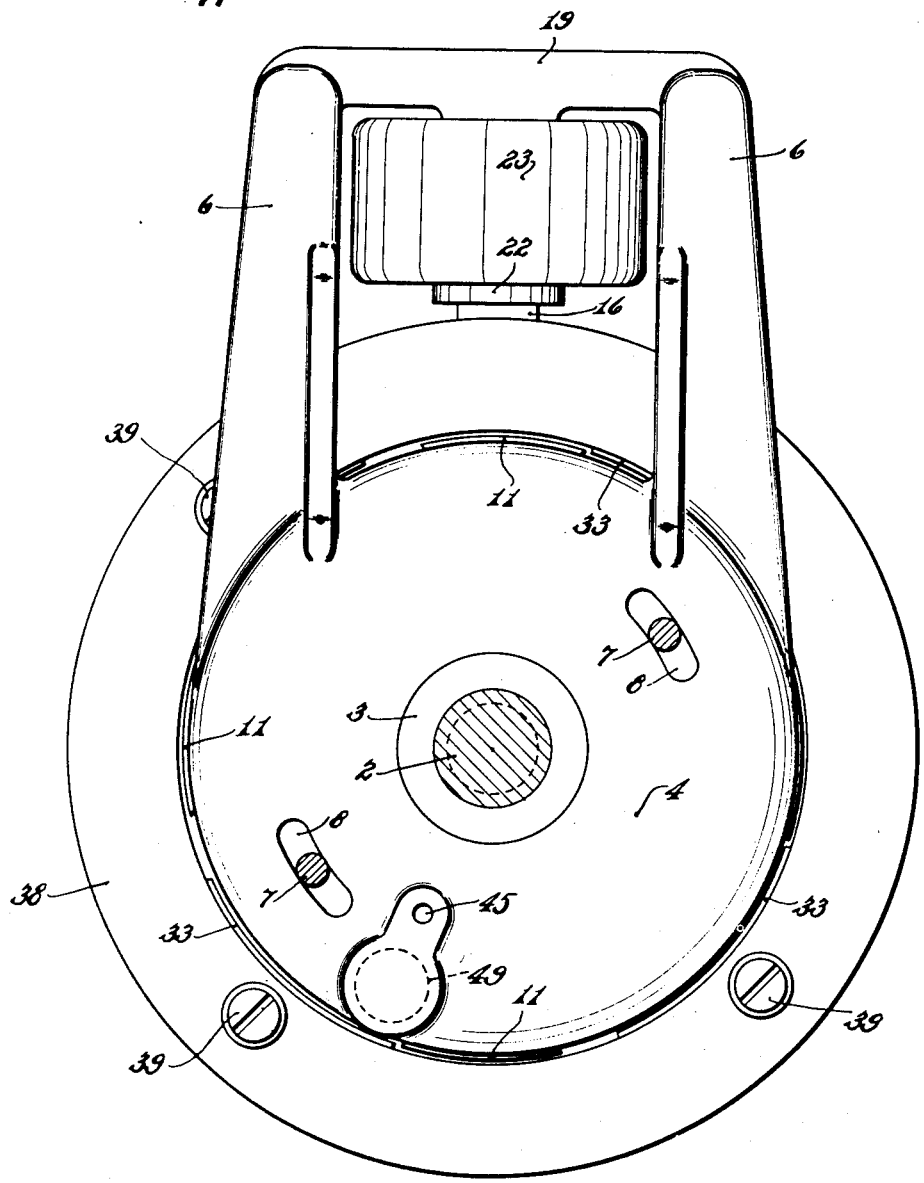
Fig. 3 is a cross-sectional view, taken on the line 3—3 of Fig. 2.

Referring to these drawings; the stator of the magneto and the stator of the alternator have a common support, which is adapted to be fixed to the crankcase of an engine. Both the magneto and the alternator have a common magnetic rotor, which is adapted to be fixed to the crankshaft of the engine. In Fig. 2, a portion of the engine crankcase is shown at 1 and its crankshaft at 2. On the crankcase 1 and encompassing the crankshaft 2 is a pilot hub 3, the periphery of which is in true coaxial relation with the crankshaft, and on which the support for the stator is mounted. This support (Fig. 1) is of non-magnetic metal and comprises a circular portion 4 with a marginal flange 5 and two arms 6 (Figs. 1 and 3) projecting beyond the flange 5 in spaced parallel relation. The support has a hole centrally of the portion 5 to receive and closely fit the pilot hub 3. The support is adapted to be fastened to the engine crankcase by means of two cap screws 7, which each pass through a slot 8 in the support and thread into suitable bosses 9 on the engine crankcase 1. The slots 8 are curved from the axis of shaft 2 as a radius so that the support for the stators may be shifted angularly of the shaft for adjustment and primarily for the purpose of varying the timing of the ignition spark produced by the magneto.

The stator of the alternator includes two laminated iron coil cores 10, mounted in spaced parallel relation on the central part 4 of the support and located one on each side of the crankshaft 2. Each core has an enlarged end 11, provided with a convex polar surface 12 which is located in coaxial relation with shaft 2. A coil 13 is wound on each core 10 and the core is then clamped against two pads 14 on the support by means of two screws 15. The polar surfaces 12 of the cores project slightly beyond the flange 5 for cooperation with inner pole shoes of the magnetic rotor in a manner later to be described.

The stator of the magneto includes a laminated iron structure, having a central coil core 16 located radially with respect to shaft 2, and two laterally-spaced parallel legs 17 and 18, located one on each side of core 16, together with a yoke 19, which interconnects the three parallel members 16, 17 and 18. This laminated structure is secured to the arms 6 of the support by means of screws 20. Two of these pass through holes one near each end of the yoke 19 and the two others pass through the lower ends of legs 17 and 18. All the screws thread into bosses 21 on the arms 6 and serve to clamp the laminated structure against the faces of such bosses. The core 16 carries primary and secondary coils 22 and 23, respectively. 24 represents the high tension terminal on the secondary coil 23, which terminal is adapted for connection to the spark plug of the engine. The members 16, 17 and 18 have concave polar surfaces 25, 26 and 27, respectively, coaxial with shaft 2 and adapted for cooperation with outer pole shoes of the magnetic rotor in a manner later to be described.

The magnetic rotor is carried by the engine flywheel 28, shown as secured to the crankshaft 2 by a key 29 and nut 30. The flywheel, on its inner side, has flat annular parts 31 to which the magnetic elements of the rotor are secured.

These elements, in the form herein shown, comprise four permanent magnets 32 of bar form, the radial center lines of which are spaced 90° apart, and four laminated iron elements 33, which interconnect the magnets. Each element 33 interconnects the like poles of two successive magnets in the series, as indicated in Fig. 1, so that successive members 33 in the circular series are of opposite polarity. Each member 33 has an inner pole shoe 34 of relatively large angular extent with a concave surface, coaxial with shaft 2, for cooperation with the polar surfaces 12 of the coil-carrying cores of the alternator. Two of the elements 33 also have outer and convex pole shoes 35, located one near each polar end of one of the magnets 32 and having convex surfaces 36 coaxial with shaft 2 for cooperation with the concave surfaces 25, 26 and 27 of the magneto stator in a manner later to be described. These magnetic elements 32 and 33 are mounted between outer and inner annular rings 37 and 38 of nonmagnetic material. The assembly of magnetic elements and rings are clamped together and against the surfaces 31 of flywheel 28 by a series of screws 39 (Figs. 1 and 3), threaded into the flywheel.

The breaker point mechanism for the magneto is carried by the central part 4 of the support and is located in the space between the two coils 13 of the alternator. Such mechanism, in the example shown, comprises a member 40 of insulating material, mounted for sliding movement radially of shaft 2 in a groove in a post 41, formed on the support part 4. A metallic gib 42, secured as indicated to the post 41, holds the slide 40 in place in its groove. This gib projects beyond the post 41 and carries a breaker point 43 for cooperation with a breaker point 44 fixed on the lower end of the slide. A spring 44', secured by a screw 45 to part 4, presses against the lower end of slide 40 and holds its upper end against the periphery of a cam 46, fixed on shaft 2. 47 is a felt wiper, fixed in post 41 and bearing on the periphery of the cam. This wiper is saturated with oil and serves to lubricate and clean the cam. The condenser for the breaker mechanism is contained in a metallic case 48, which is set on end and partially telescoped in a well 49 formed on the part 4 of the support and secured thereto by a screw 50, which clamps a flange 51 on the case 48 against the part 4. The case 48 forms one terminal of the condenser and such terminal is grounded to the metallic support by the screw 50 and flange 51. The other terminal of the condenser is contained in a post 52 of insulation and has a screw 53 for clamping one end of a flexible lead 54, the other end of which is connected to the movable breaker point 44.

The electrical connections for the magneto are the usual ones and are shown diagrammatically in Fig. 8. One terminal of the primary coil 22 and one terminal of the secondary coil 23 is grounded. The other terminal of the secondary coil is shown at 24 and is adapted to receive a wire leading to the spark plug of the engine. The other terminal of the primary coil is connected by wires 55 and 54 to the breaker point 44. The cooperating breaker point 43 is grounded. The condenser 48 has one terminal grounded and the other terminal connected to the wires 55 and 54 and is thus bridged across the breaker points.

The coils 13 of the generator may be connected in series or parallel as desired and arranged in any desired way to supply a lighting or other circuit.

In operation, the magnetic rotor revolves clockwise, as viewed in Fig. 1. In the position shown in Fig. 1, the several inner pole shoes 34 of the rotor are disconnected from the several surfaces 12 of the coil-carrying cores 10 of the alternator and there is no flow of magnetic flux through either of these cores. As the rotor continues to turn, one shoe 34 of north polarity will engage the upper surface 12 of the right hand core 10 while the next shoe in the series, which is of south polarity, will engage the other surface 12 of the same core. Simultaneously the shoe 34 of north polarity, which lies diametrically opposite the first named shoe, will engage the lower surface 12 of the left hand core 10, while the other surface 12 of the same core is engaged by the other shoe 34 of south polarity. Flux thus flows down through the right hand core 10 and up through the left hand core 10. As the rotor turns still further, the described magnetic circuits will be broken as the shoes 34 move far enough to become disconnected from the surfaces 12. Shortly thereafter, the shoes 34 become connected with the surfaces 12 at the ends of the cores opposite to those to which they were previously connected, so that flux flow in a reverse direction is established through the cores 10. The result is the production of an alternating current having two cycles per revolution with each alternation separated from the next by a portion of zero voltage.

The magneto operates during one of these periods of zero voltage, for example, while the magnetic rotor is moving from the Fig. 7 to the Fig. 1 position. With the rotor positioned as shown in Fig. 1, a magnetic circuit from one of the magnets 32 is established through core 16 as follows, from the left hand shoe 35 of north polarity, which then connects with surface 26, up through leg 17, across yoke 19, down through core 16 to the right hand shoe 35, which then connects with the surface 25. At this time, the magnets 32 are disconnected from the cores 10 of the alternator and full flow of flux from the magnet 32, which is connected to the shoes 35, through the described circuit is established. The breaker points 43 and 44 are separated, when the described magneto circuit is established, whereby magnetic flux builds up rapidly in such circuit. Thereafter, the breaker points become engaged and this occurs before the described magneto circuit is broken, so that the coil 22 is in a closed circuit and acts to resist change of flux in the described magnetic circuit. As the rotor continues to turn clockwise, the left and right hand shoes 35 become disconnected from the surfaces 26 and 25, to which they were previously connected, and connect with the surfaces 25 and 27, respectively. A magnetic circuit is then established from the left hand shoe 35, up through core 16, across yoke 19 and down through leg 18 to the right hand shoe 35. The breaker points 43 and 44 are then separated and a change of flux through core 16 occurs from a maximum in one direction to a maximum in the other direction, whereby to generate in coil 23 an electromotive force for ignition purposes.

As shown, the magneto is designed to produce one spark per revolution. However, it is within the province of the invention to produce more sparks per revolution if desired. All that is necessary is to add outer pole shoes 35 to any of the other magnets 32 of the series and these magnets will then cooperate with the magnetic stator of the magneto during periods when they are disconnected from the cores 10 of the alternator. All of the magnets might conceivably be so used. In such a case, the alternator would serve to utilize the magnets during those intervals, when they are not needed for the magneto operation and when they would otherwise be idle. Obviously, more than one magnetic stator could be provided if desired. The number of poles of this alternator may also be varied, as desired, although obviously there should be an even number of such poles.

I claim:

1. In a combined magneto and alternator, comprising, an annular magnetic rotor having an even plurality of permanent bar magnets symmetrically spaced in a circular series about the axis of rotation of the rotor, and a like number of members of magnetic material each interconnecting the like poles of two successive magnets of the series, whereby successive members of the series are of opposite polarity, inner pole shoes one on each member comparable in angular extent to the angular spacing between the like polar ends of two successive magnets of the series, and outer pole shoes formed one on each of two successive connecting members and located one closely adjacent one polar end and the other closely adjacent the other polar end of that magnet which is located between said two connecting members, said outer pole shoes each being much smaller in angular extent than any one of the inner pole shoes; an inner stator including a coil for the generation of alternating current and a core for the coil with its ends so spaced as to be operable during rotation of the rotor to connect two inner pole shoes of opposite polarity; and an outer stator including a magnetic core structure with ends so spaced as to be operable during rotation of the rotor to connect with the outer pole shoes of the rotor, and primary and secondary coils carried by the core structure for the generation of ignition current.

2. A combined magneto and alternator, comprising, an annular magnetic rotor having an even plurality of permanent bar magnets symmetrically spaced in a circular series about the axis of rotation of the rotor, and a like number of members of magnetic material each interconnecting the like poles of two successive magnets of the series, whereby successive members of the series are of opposite polarity, inner pole shoes one on each member, and outer pole shoes formed one on each of two successive connecting members and located one closely adjacent one polar end and the other closely adjacent the other polar end of that magnet which is located between said two connecting members; an inner stator including a coil for the generation of alternating current, and a core for the coil with its ends so spaced as to be operable during certain periods of rotation of the rotor to connect it with two inner pole shoes of opposite polarity and during other periods of such rotation to be disconnected from said shoes; and an outer stator including a magnetic core structure with ends so spaced as to be operable during rotation of the rotor to connect with the outer pole shoes of the rotor during periods when said first-named cores are disconnected from said inner pole shoes.

3. A combined magneto and alternator, comprising, an annular magnetic rotor having an even plurality of permanent bar magnets angularly spaced one from another in a circular series, a like number of magnetic members interconnecting like poles of successive magnets in the series, each said member having an inner concave pole shoe comparable in angular extent to the angular spacing between the polar ends of the two magnets which it connects; an outer stator including a magnetic structure having a core, two legs one on each side of the core, and a yoke connecting the legs and core at one end, the other end of the core having a concave surface, the other end of each leg having concave surfaces spaced equally from the concave surface of the core, each of two successive magnetic-connecting members of the rotor having an outer and convex pole shoe much smaller in angular extent than that of an inner pole shoe, said outer pole shoes being located adjacent the polar ends of that magnet which lies between said two connecting members and being so spaced that during rotation of the rotor one shoe will connect with the concave surface of one leg and the other shoe will connect with the concave surface of the core and shortly after the first shoe will connect with the concave surface of the core and the second shoe will connect with the concave surface of the other leg, whereby a flow of flux from the last-named magnet is created first in one and then in the other direction through said core, primary and secondary coils on said core, breaker mechanism, and an electrical circuit including the primary coil and said mechanism and controlled by the latter as the rotor rotates so as to open the circuit shortly after the outer pole shoes break the magnetic circuit at the concave surface of the core and at the concave surface of the second-named leg to produce an electromotive force in the secondary coil for the production of an ignition spark; an inner stator including a core of magnetic material with convex ends spaced so as to be connected by two pole shoes of opposite polarity during rotation of the rotor for the production of flux flow first in one and then in the opposite direction through the core, and a coil carried by the core in which an alternating current is generated.

KENNETH A. HARMON.